US012792846B2

(12) United States Patent
Jain et al.

(10) Patent No.: US 12,792,846 B2
(45) Date of Patent: Nov. 10, 2026

(54) GENERATING MULTI-MODAL RESPONSE(S) THROUGH UTILIZATION OF LARGE LANGUAGE MODEL(S) AND OTHER GENERATIVE MODEL(S)

(71) Applicant: GOOGLE LLC, Mountain View, CA (US)

(72) Inventors: Sanil Jain, Sunnyvale, CA (US); Wei Yu, Mountain View, CA (US); Alessandro Agostini, Zurich (CH); Ágoston Weisz, Zurich (CH); Michael Andrew Goodman, Oakland, CA (US); Attila Dankovics, Zurich (CH); Elle Chae, Sunnyvale, CA (US); Evgeny Sluzhaev, Zurich (CH); Amin Ghafouri, San Francisco, CA (US); Golnaz Ghiasi, Mountain View, CA (US); Igor Petrovski, Zurich (CH); Konstantin Shagin, Adliswil (CH); Marcelo Menegali, San Francisco, CA (US); Oscar Akerlund, Zurich (CH); Rakesh Shivanna, Sunnyvale, CA (US); Thang Luong, Santa Clara, CA (US); Tiffany Chen, San Francisco, CA (US); Vikas Peswani, Mountain View, CA (US); Yifeng Lu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 103 days.

(21) Appl. No.: 18/385,270

(22) Filed: Oct. 30, 2023

(65) Prior Publication Data

US 2025/0139379 A1 May 1, 2025

(51) Int. Cl.
*G06F 40/40* (2020.01)
*G06F 16/483* (2019.01)

(52) U.S. Cl.
CPC ............ *G06F 40/40* (2020.01); *G06F 16/483* (2019.01)

(58) Field of Classification Search
None
See application file for complete search history.

(56) References Cited

U.S. PATENT DOCUMENTS 10,459,995 B2 10/2019 Lev-Tov
11,269,678 B2 * 3/2022 Gruber .................... G10L 15/00
(Continued)

FOREIGN PATENT DOCUMENTS

WO 2023101743 A1 6/2023

OTHER PUBLICATIONS

Wu, Shengqiong, et al. "NeXT-GPT: Any-to-Any Multimodal LLM." arXiv preprint arXiv:2309.05519 (2023). (Year: 2023).*
(Continued)

*Primary Examiner* — Paras D Shah
*Assistant Examiner* — Ali M Hassan
(74) *Attorney, Agent, or Firm* — Gray Ice Higdon

(57) ABSTRACT

Implementations relate to generating multi-modal response (s) through utilization of large language model(s) (LLM(s)) and other generative model(s). Processor(s) of a system can: receive natural language (NL) based input, generate a multi-modal response that is responsive to the NL based output, and cause the multi-modal response to be rendered. In some implementations, and in generating the multi-modal response, the processor(s) can process, using a LLM, LLM input to generate LLM output, and determine, based on the LLM output, textual content and generative multimedia content for inclusion in the multi-modal response. In some (Continued)

implementations, the generative multimedia content can be generated by another generative model (e.g., an image generator, a video generator, an audio generator, etc.) based on generative multimedia content prompt(s) included in the LLM output and that is indicative of the generative multimedia content. In various implementations, the generative multimedia content can be interleaved between segments of the textual content.

17 Claims, 7 Drawing Sheets

(56) References Cited

U.S. PATENT DOCUMENTS

| | | | | |
|---|---|---|---|---|
| 11,361,571 | B1 | 6/2022 | Fusco | |
| 11,449,684 | B2 | 9/2022 | Luong | |
| 11,907,674 | B1 | 2/2024 | Akerlund | |
| 2019/0384826 | A1* | 12/2019 | Doggett | G06F 16/435 |
| 2020/0342018 | A1 | 10/2020 | Lange | |
| 2021/0089724 | A1 | 3/2021 | Luong | |
| 2022/0157308 | A1 | 5/2022 | Fink et al. | |
| 2022/0237435 | A1 | 7/2022 | Huang | |
| 2023/0326212 | A1 | 10/2023 | Chawda | |
| 2024/0347058 | A1 | 10/2024 | Rossi | |
| 2025/0014606 | A1* | 1/2025 | Wong | G11B 27/031 |

OTHER PUBLICATIONS

Li, Huayang, et al. âTextBind: Multi-Turn Interleaved Multimodal Instruction-Following in the Wild.â ArXiv.org, 2023, arxiv.org/abs/2309.08637v2. Accessed Jan. 21, 2026. (Year: 2023).*

Mewknows, r/OpenAI; "Did you know you can make ChatGPT send images?"; retrieved from the internet: URL:https://www.reddit.com/r/OpenAI/comments/zh4kf4/did_you_know_you_can_make_chatgpt_send_images/?sort=confidence&rdt=65127 [retrieved on Oct. 24, 2024]; 8 pages; dated Dec. 9, 2022.

Peters, M. E. et al.; Semi-supervised Sequence Tagging with Bidirectional Language Models; Allen Institute for Artificial Intelligence; 10 pages; dated Apr. 29, 2017.

Radford, A. et al.; Language Models are Unsupervised Multitask Learners; OpenAI blog; 1(8), 9; 24 pages; dated 2019.

Radford, A. et al; Improving Language Understanding by Generative Pre-Training; Preprint, Work in progress; 12 pages; dated 2018.

Editor; Generative AI models explained; AltexSoft; https://www.altexsoft.com/blog/generative-ai/; 21 pages; dated Oct. 13, 2023.

Li, C. et al.; TagGPT: Large Language Models are Zero-shot Multimodal Taggers; 13 pages; dated Apr. 6, 2023.

Nvidia; What's Generative AI? https://web.archive.org/web/20230323225348/https://ndivia.com/en-en/glossary/data-science/generative-ai/; 11 pages; dated Mar. 23, 2023.

Brown et al.; Language Models are Few-Shot Learners; Advances in newral information processing systems; 33, 1877-1901; dated 2020.

Mccoy, Julia; Discover How AI Turns Your Text Prompts into Harmonious Music; 42 pages; dated Aug. 9, 2023.

Sandzer-Bell, Ezra; WavTool: The World's First Text-to-Music AI DAW Uses GPT-4; 24 pages; dated Apr. 23, 2023.

VEED.IO; AI Music Generator; 13 pages; dated Nov. 23, 2023.

Li, H et al., "TextBind: Multi-turn Interleaved Multimodal Instruction-following"; arXiv.org, Cornell University; arXiv:2309.08637; 20 pages; dated Sep. 14, 2023.

Wu, S. et al., "NExT-GPT: Any-to-Any Multimodal LLM"; arXiv.org, Cornell University; arXiv:2309.05519; 22 pages; dated Sep. 13, 2023.

European Patent Office; International Search Report and Written Opinion issued in Application No. PCT/US2024/050044; 9 pages; dated Jan. 28, 2025.

ZDNET, Bing Chat can now respond to questions with images, charts, and other visual elements, 8 pages, dated May 15, 2023.

Mehdi, Y., Reinventing search with a new AI-powered Microsoft Bing and Edge, your copilot for the web, 6 pages, dated Feb. 7, 2023.

Liu, A., "External Reasoning: Towards Multi-Large-Language-Models Interchangeable Assistance with Human Feedback", arXiv.org, arXiv:2307.12057, 29 pages, dated Jul. 5, 2023.

International Bureau of WIPO; International Preliminary Report on Patentability (Chapter I of the Patent Cooperation Treaty) issued in Application No. PCT/US2024/050044, 6 pages, dated May 15, 2026.

Gosh, A. et al.; QueryMintAI: Multipurpose Multimodal Large Language Models for Personal Data, Applied Research, 21 pages, dated 2024.

Thirunavukarasu, A. et al.; Large Language Models in Medicine, Nature Medicine, 11 pages, dated 2023.

Wang, X. et al.; Moda Verse: Efficiently Transformation Modalities with LLMS, 11 pages, dated 2024.

European Patent Office; Communication pursuant to Article 94(3) EPC issued in Application No. 24795016.5, 7 pages, dated Jan. 13, 2026.

European Patent Office; Summons issued in Application No. 24795016.5, 9 pages, dated Aug. 21, 2026.

* cited by examiner

GENERATING MULTI-MODAL RESPONSE(S) THROUGH UTILIZATION OF LARGE LANGUAGE MODEL(S) AND OTHER GENERATIVE MODEL(S)

BACKGROUND

Various generative models have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate a response that is responsive to the NL based input and that is to be rendered at the client device. In many instances, these LLMs can cause textual content to be included in the response. In some instances, these LLMs can additionally, or alternatively, cause multimedia content, such as images, to be included in the response (e.g., based on causing image retrieval to be performed). These responses that include both textual content and multimedia content are referred to herein as multi-modal responses.

However, the multimedia content in these multi-modal responses is often pre-pended or post-pended to the textual content. As a result, the multimedia content is not contextualized with respect to the textual content in these multi-modal responses. Not only does this lack of contextualization detract from the user experience, but it may also result in computational resources being unnecessarily consumed. These issues may be exacerbated when a user is interacting with these LLMs via a client device that has limited display real estate, such as a mobile phone. For instance, if the multi-modal response includes multiple paragraphs of text and a corresponding image associated with each of the multiple paragraphs of text, but all of the corresponding images are pre-pended and/or post-pended to the text, then the user may consume all of the text prior to viewing the images, or vice versa. As a result, the user may consume a portion of the textual content, then scroll up or down to view the corresponding image for that paragraph, and then scroll back up or down to continue consuming a next paragraph. However, this unnecessarily consumes computational resources, in the aggregate across a population of users, due to an increased quantity of user inputs, and prolongs a duration of the human-to-computer interaction between the user and the LLM.

Further, the multimedia content in these multi-modal responses is often limited to multimedia content that is readily available. For instance, assume that the NL content requests the LLM to generate LLM output that includes textual content about a fictious creature that does not exist and that includes multimedia content depicting the fictious creature that does not exist. In this instance, and since there is not any images of the fictious creature that are readily available, the LLM may fail in generating the multi-modal response as requested by a user. While the user could interact with other generative models (e.g., an image generator model), the user would likely have to pause an interaction with the LLM, initiate an interaction with the other generative model to obtain the desired content, and then resume the interaction with the LLM. Further, in interacting with the other generative model, the user may have to iteratively refine NL content that is provided to the other generative model to ensure it reflects the user's expectations of the fictious creature. As a result, computational resources are unnecessarily consumed through the additional interaction with the other generative model due to an increased quantity of user inputs and prolonging of a a duration of the human-to-computer interaction between the user and the LLM and/or the user and the other generative model. Thus, there is a need in the art for improved generation of multi-modal responses through utilization of LLMs and other generative models.

SUMMARY

Implementations described herein relate to generating multi-modal response(s) through utilization of large language model(s) (LLM(s)) and other generative model(s). Processor(s) of a system can: receive natural language (NL) based input associated with a client device of a user, generate, using an LLM, a multi-modal response that is responsive to the NL based output and that includes both textual content and multimedia content, and cause the multi-modal response to be rendered at the client device. In various implementations, and in generating the multi-modal response, the processor(s) can process, using a LLM, LLM input to generate LLM output, and determine, based on the LLM output, textual content and multimedia content for inclusion in the multi-modal response. In some implementations, the multimedia content can be generative multimedia content in that it is generated by another generative model (e.g., an image generator, a video generator, an audio generator, etc.) based on generative multimedia content prompt(s) included in the LLM output and indicative of the generative multimedia content. In various implementations, the generative multimedia content can be interleaved between segments of the textual content. Accordingly, the multimedia content is logically arranged with respect to the textual content, which results in a more natural interaction that not only guides a human-to-computer interaction between the user and the system through utilization of the LLM, but also conserves computational resources in consumption of the multi-modal response. Further, the multimedia content can be obtained from other generative model (s) that are in addition to the LLM with which the user is interacting, thereby obviating the need for the user to initiate and/or engage in direct interactions with these other generative model(s), which results in a more natural interaction that not only guides a human-to-computer interaction between the user and the system through utilization of the LLM, but also conserves computational resources in generating the multi-modal response.

For example, assume that the system receives NL based input of "Write an electronic encyclopedia page for an Elkbird-a mythical creature that lays eggs and that looks like an elk". In this example, the textual content can include an appearance of the Elkbird, a description of a mating call of the Elkbird, a geographical range of the Elkbird, and so on. Further, the multimedia content can include various multimedia content items associated with the Elkbird, such as images, videos, audio, gifs, or the like. However, the Elkbird is a mythical creature that does not exist, so there are no images, videos, audio, gifs, or the like of the Elkbird. Nonetheless, in generating the multi-modal response to be rendered at the client device, the system can interact with other generative model(s) capable of processing generative multimedia content prompts to generate images, videos, audio, gifs, or the like of the Elkbird. Further, this generative multimedia content can be interleaved with respect to the textual content about the Elkbird all with only a single call to the LLM (e.g., a so-called "one-shot" approach).

In some implementations, and prior to the LLM being utilized in generating the multi-modal responses, the system can fine-tune the LLM to subsequently enable the LLM to determine where the multimedia content (e.g., generative multimedia content or non-generative multimedia content) should be included in the multi-modal responses and relative to the textual content. For example, for the generative multimedia content, the system can obtain a plurality of training instances where each of the plurality of training instances includes: (1) a corresponding NL based input; and (2) a corresponding multi-modal response that is responsive to the corresponding NL based input, the corresponding multi-modal response including corresponding textual content and corresponding generative multimedia content prompt(s) indicative of corresponding generative multimedia content item(s) to be included in the corresponding multi-modal response. As another example, for the non-generative multimedia content, the system can obtain a plurality of training instances where each of the plurality of training instances includes: (1) a corresponding NL based input; and (2) a corresponding multi-modal response that is responsive to the corresponding NL based input, the corresponding multi-modal response including corresponding textual content and corresponding multimedia content tag(s) indicative of corresponding non-generative multimedia content item(s) to be included in the corresponding multi-modal response.

In some versions of these implementations, one or more of the plurality of training instances can be curated (e.g., by a developer associated with the system that indicates where the corresponding generative multimedia content prompt(s) and/or the corresponding multimedia content tag(s) belong), whereas in additional or alternative versions of these implementations, one or more of the plurality of training instances can be automatically generated (e.g., without intervention of the developer). Further, the system can fine-tune the LLM based on the plurality of training instances to subsequently enable the LLM to generate the multi-modal responses that include generative multimedia content and/or non-generative multimedia content.

In some implementations, the LLM input that is processed to generate the LLM output corresponds to the raw NL based input that was provided by the user. In additional or alternative implementations, the LLM input that is processed to generate the LLM output corresponds to the NL based input in structured form (and optionally other context(s) and/or prompt(s) (e.g., a prompt that indicates any response to the NL based input should be a multi-modal response that includes the multimedia content)). The LLM output can include, for example, a probability distribution over a sequence of tokens, such as words, phrases, or other semantic units that are predicted to be responsive to the NL based input, non-generative multimedia content tags for use in obtaining non-generative multimedia content that is predicted to be responsive to the NL based input, and/or generative multimedia content prompts for use in obtaining generative multimedia content that is predicted to be responsive to the NL based input. In these implementations, the system can determine the textual content to be included in the multi-modal response based on the probability distribution over the sequence of tokens that are predicted to be responsive to the NL based input, and can determine the multimedia content to be included in the multi-modal response based on the probability distribution over the non-generative multimedia content tag(s) and/or the generative multimedia content prompt(s) that are predicted to be responsive to the NL based input. In some versions of those implementations, the inclusion of the multimedia content tag(s) and/or the generative multimedia content prompt(s) can be utilized as a signal that any response generated that is responsive to the NL based input should be the multi-modal response. However, it should be understood that other signals can be utilized to determine that any response generated that is responsive to the NL based input should be the multi-modal response.

For example, in additional or alternative implementations, a client device context of the client device of the user that provided the NL based input and/or a user context of the user that provided the NL based input can be utilized as a signal that any response generated that is responsive to the NL based input should be the multi-modal response. In these implementations, the client device context can include a display size of a display of the client device of the user, network bandwidth of the client device of the user, connectivity status of the client device of the user, a modality by which the NL based input was received, and/or other client device contexts. The client device context can, for instance, serve as a proxy for whether the client device is capable of efficiently rendering multimedia content (e.g., in view of bandwidth and/or connectivity considerations), whether the client device is well suited for rendering different types of multimedia content (e.g., whether the client device includes speaker(s) and/or a display), and/or otherwise indicate of whether a multi-modal response should be generated. Additionally, or alternatively, the user context can include a geographical region in which the user is located when the NL based input is received, a user account status of a user account of the user of the client device, historical NL based inputs provided by the user of the client device, or user preferences of the user of the client device, and/or other user contexts. The user context can, for instance, serve as a proxy for whether the user desires multi-modal responses (or desires multi-modal responses in certain situations) and/or otherwise indicate whether a multi-modal response should be generated. In all of the above instances, the system can cause the NL based input and/or the LLM input to be augmented with a prompt that indicates a multi-modal response that includes multimedia content should be generated.

In some implementations, and in response to determining that the LLM output includes the multimedia content tag(s) and/or the generative multimedia content prompt(s), the system can obtain the multimedia content to be included in the multi-modal response. Continuing with the above example where the NL based input is "Write an electronic encyclopedia page for an Elkbird-a mythical creature that lays eggs and that looks like an elk", and as noted above, the generative multimedia content can include generative images, generative videos, generative audio, generative gifs, or the like. Accordingly, and by virtue of the fine-tuning of the LLM as described herein, the generative multimedia content prompt(s) can include "{prompt: [large antlered bird; long neck; long tailor; color: white, brown, black, or red; lays golden eggs] image generator {url: . . . }}", "{prompt: [eerie male mating call for a bird/elk hybrid animal] audio generator {url: . . . }}", "{prompt: [eerie female mating call for a bird/elk hybrid animal] audio generator {url: . . . }}", or the like. In some versions of these implementations, the system can utilize the generative multimedia content prompts to select a generative multimedia content model, from among a plurality of generative multimedia content models, to be utilized in generating the generative multimedia content. For example, the prompt(s) may identify a type of the generative multimedia content to be generated (e.g., ""{prompt . . . image generator {url: . . . }}" or "{prompt: . . . audio generator {url: . . . }}" from the above examples). Accordingly, the system can cause the generative multimedia content prompt(s) to be submitted to the generative multimedia content models, and can obtain the generative multimedia content in response to submitting the prompt(s). Notably, although the generative multimedia content prompt(s) are included in the LLM output and/or the textual content, the generative multimedia content prompt(s) themselves may never be rendered or perceivable to the user that provided the NL based input.

Although the above example is described with respect to the multimedia content being generative multimedia content, it should be understood that is for the sake of example and is not meant to be limiting. For instance, the LLM output and/or the textual content may additionally, or alternatively, include multimedia content tags for non-generative multimedia content. In these instances, the system can determine, based on the multimedia content tags, non-generative multimedia content queries to be submitted over a search system (e.g., an image search system, a video search system, an audio search system, or the like) to obtain the non-generative multimedia content. Similarly, although the multimedia content tags are included in the LLM output and utilized in obtaining the multimedia content tags, the multimedia content tags themselves may never be rendered or perceivable to the user that provided the NL based input.

In various implementations, and in causing the multi-modal response to be rendered at the client device, the system can cause the textual content to be rendered in a streaming manner while the multimedia content is still being obtained. For instance, the textual content can be rendered at the client device (e.g., visually via a display of the client device and/or audibly via speaker(s) of the client device) while the system causes the generative multimedia content to be obtained. However, as the generative multimedia content is obtained, they can be inserted into the multi-modal response. This further reduces latency in causing the multi-modal response to be rendered for presentation to the user, and results in an even more natural interaction that not only guides the human-to-computer interaction between the user and the system through utilization of the LLM, but also conserves computational resources in consumption of the multi-modal response.

By using the techniques described herein, various technical advantages can be achieved. As one non-limiting example, by interleaving the textual content with the multimedia content in the multi-modal responses, a quantity of user inputs received at the client device can be reduced, thereby conserving computational resources. While the conservation of computational resources may be relatively minimal at a single client device, the conservation of computational resources, in aggregate, across a population of client devices can be substantial. For instance, users need not scroll up or down to view contextually relevant multimedia content. As another non-limiting example, logically arranging the multimedia content with respect to the textual content can result in a more natural interaction that not only guides a human-to-computer interaction between the user and the system through utilization of the LLM, but also conserves computational resources in consumption of the multi-modal response. Again, users need not scroll up or down to view contextually relevant multimedia content. As yet another non-limiting example, latency in causing the multi-modal response to be rendered can be reduced since the textual content can be rendered while the multimedia content is being obtained, and the LLM provides an indication of what the multimedia content should include via the multimedia content tags and/or the generative multimedia content prompts, thereby further reducing latency in actually obtaining the multimedia content. As yet another non-limiting example, by enabling the LLM to obtain the generative multimedia content from the other generative model(s), the user need not directly interact with these other generative model(s) by launching another software application, web browser, or tab, thereby conserving computational resources no only by obviating the need to launch another software application, web browser, or tab, but by obviating this interaction altogether.

The above description is provided as an overview of some implementations of the present disclosure. Further description of those implementations, and other implementations, are described in more detail below.

DETAILED DESCRIPTION OF THE DRAWINGS

Figure 1:
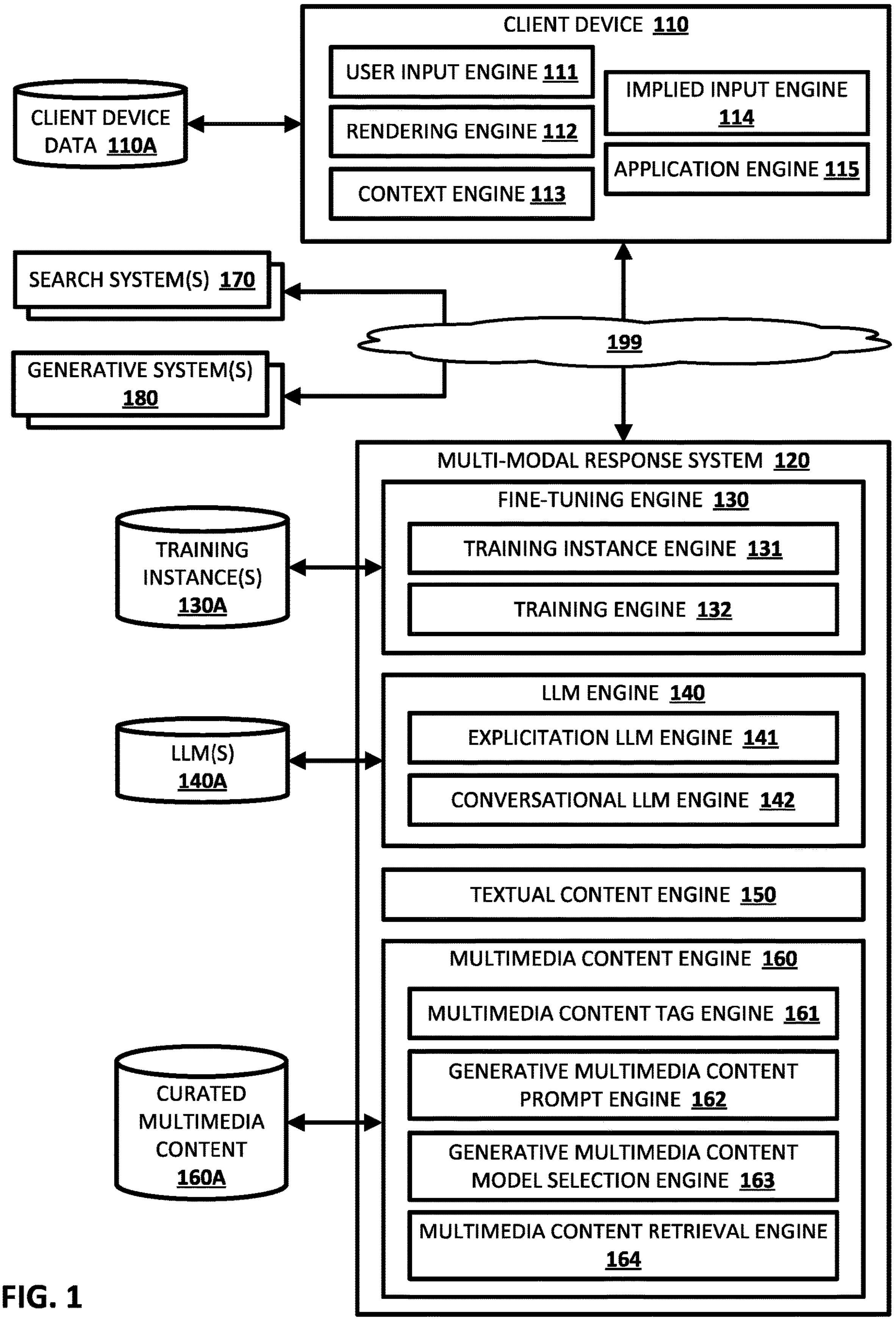
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a multi-modal response system 120. In some implementations, all or aspects of the multi-modal response system 120 can be implemented locally at the client device 110. In additional or alternative implementations, all or aspects of the multi-modal response system 120 can be implemented remotely from the client device 110 as depicted in FIG. 1 (e.g., at remote server(s)). In those implementations, the client device 110 and the multi-modal response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or multi-modal responses and/or other responses (e.g., uni-modal responses) that are responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with or otherwise provide access to (e.g., as a frontend) the multi-modal response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 110.

Some instances of a NL based input described herein can be a query for a response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image or video prompt that is based on an image or video captured by a vision component of the client device 110.

In various implementations, the client device 110 can include a rendering engine 112 that is configured to render content (e.g., uni-modal responses, multi-modal responses, an indication of source(s) associated with portion(s) of the uni-modal and/or multi-modal responses, and/or other content) for audible and/or visual presentation to a user of the client device 110 using one or more user interface output devices. For example, the client device 110 can be equipped with one or more speakers that enable audible content to be provided for audible presentation to the user via the client device 110. Additionally, or alternatively, the client device 110 can be equipped with a display or projector that enables textual content or other visual content (e.g., image(s), video (s), etc.) to be provided for visual presentation to the user via the client device 110.

In various implementations, the client device 110 can include a context engine 113 that is configured to determine a client device context (e.g., current or recent context) of the client device 110 and/or a user context of a user of the client device 110 (or an active user of the client device 110 when the client device 110 is associated with multiple users). In some of those implementations, the context engine 113 can determine a context based on data stored in client device data database 110A. The data stored in the client device data database 110A can include, for example, user interaction data that characterizes current or recent interaction(s) of the client device 110 and/or a user of the client device 110, location data that characterizes a current or recent location(s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., a response) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of search result(s) or a response for the implied NL based input, optionally independent of any explicit NL based input that requests rendering of the search result(s) or the response. For example, the implied input engine 114 can use one or more past or current contexts, from the context engine 113, in generating an implied NL based input, determining to submit the implied NL based input, and/or in determining to cause rendering of search result(s) or a response that is responsive to the implied NL based input. For instance, the implied input engine 114 can automatically generate and automatically submit an implied query or implied prompt based on the one or more past or current contexts. Further, the implied input engine 114 can automatically push the search result(s) or the response that is generated responsive to the implied query or implied prompt to cause them to be automatically rendered or can automatically push a notification of the search result(s) or the response, such as a selectable notification that, when selected, causes rendering of the search result(s) or the response. Additionally, or alternatively, the implied input engine 114 can submit respective implied NL based input at regular or non-regular intervals, and cause respective search result(s) or respective responses to be automatically provided (or a notification thereof automatically provided). For instance, the implied NL based input can be "patent news" based on the one or more past or current contexts indicating a user's general interest in patents, the implied NL based input or a variation thereof periodically submitted, and the respective search result(s) or the respective responses can be automatically provided (or a notification thereof automatically provided). It is noted that the respective search result(s) or the response can vary over time in view of, e.g., presence of new/fresh search result document(s) over time.

Further, the client device 110 and/or the multi-modal response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household, a workplace, a hotel, etc.).

The multi-modal response system 120 is illustrated in FIG. 1 as including a fine-tuning engine 130, a LLM engine 140, a textual content engine 150, and a multimedia content engine 160. Some of these engines can be combined and/or omitted in various implementations. Further, these engines can include various sub-engines. For instance, the fine-tuning engine 130 is illustrated in FIG. 1 as including a training instance engine 131 and a training engine 132. Further, the LLM engine 140 is illustrated in FIG. 1 as including an explicitation LLM engine 141 and a conversational LLM engine 142. Moreover, the multimedia content engine 160 is illustrated in FIG. 1 as including a multimedia content tag engine 161, a generative multimedia content prompt engine 162, a generative multimedia content model selection engine 163, and a multimedia content retrieval engine 164. Similarly, some of these sub-engines can be combined and/or omitted in various implementations. Accordingly, it should be understood that the various engines and sub-engines of the multi-modal response system 120 illustrated in FIG. 1 are depicted for the sake of describing certain functionalities and is not meant to be limiting.

Further, the multi-modal response system 120 is illustrated in FIG. 1 as interfacing with various databases, such as training instance(s) database 130A, LLM(s) database 140A, and curated multimedia content database 160A. Although particular engines and/or sub-engines are depicted as having access to particular databases, it should be understood that is for the sake of example and is not meant to be limiting. For instance, in some implementations, each of the various engines and/or sub-engines of the multi-modal response system 120 may have access to each of the various databases. Further, some of these databases can be combined and/or omitted in various implementations. Accordingly, it should be understood that the various databases interfacing with the multi-modal response system 120 illustrated in FIG. 1 are depicted for the sake of describing certain data that is accessible to the multi-modal response system 120 and is not meant to be limiting.

Moreover, the multi-modal response system 120 is illustrated in FIG. 1 as interfacing with other system(s), such as search system(s) 170 and generative system(s) 180. In addition to multimedia content that is included in the curated multimedia content database 160A, the multimedia content retrieval engine 163 can generate and transmit requests the search system(s) 170 and/or the generative system(s) 180 to obtain multimedia content to be included in a multi-modal response as described herein. In some implementations, the search system(s) 170 and/or the generative system(s) 180 are first-party system(s), whereas in other implementations, the search system(s) 170 and/or the generative system(s) 180 are third-party system(s). As used herein, the term "first-party" refers to an entity that develops and/or maintains the multi-modal response system 120, whereas the term "third-party" or "third-party entity" refers to an entity that is distinct from the entity that develops and/or maintains the multi-modal response system 120.

As described in more detail herein (e.g., with respect to FIGS. 2, 3, 4, 5A, and 5B), the multi-modal response system 120 can be utilized to generate multi-modal responses that are responsive to corresponding NL based inputs received at the client device 110. The multi-modal responses described herein can include not only textual content that is responsive to the corresponding NL based inputs, but can also include multimedia content that is responsive to the corresponding NL based inputs. The multimedia content can include multimedia content items, such as images, video clips, audio clips, gifs, and/or any other suitable multimedia content. In implementations where the multimedia media content is obtained using the search system(s) 170, the multimedia content can be considered "non-generative multimedia content". In implementations where the multimedia content is obtained using the generative system(s) 180, the multimedia content can be considered "generative multimedia content". Unless explicitly noted otherwise, the non-generative multimedia content and the generative multimedia content is collectively referred to herein as "multimedia content".

Notably, the multimedia content can be particularly relevant to a portion of the textual content. Accordingly, in generating the multi-modal responses, techniques described herein enable the multimedia content to be interleaved with respect to the textual content (e.g., as described and illustrated with respect to FIGS. 5A and 5B). Put another way, the multimedia content items that are particularly relevant to a portion of the textual content can be rendered along with the portion of the textual content, rather than being prepended to the textual content or post-pended to the textual content. As a result, computational resources can be conserved since a quantity of user inputs to scroll up or down to view the multimedia content are reduced and a duration of a human-to-computer dialog is reduced. Additional description of the multi-modal response system 120 is provided herein (e.g., with respect to FIGS. 2, 3, and 4).

Figure 2:
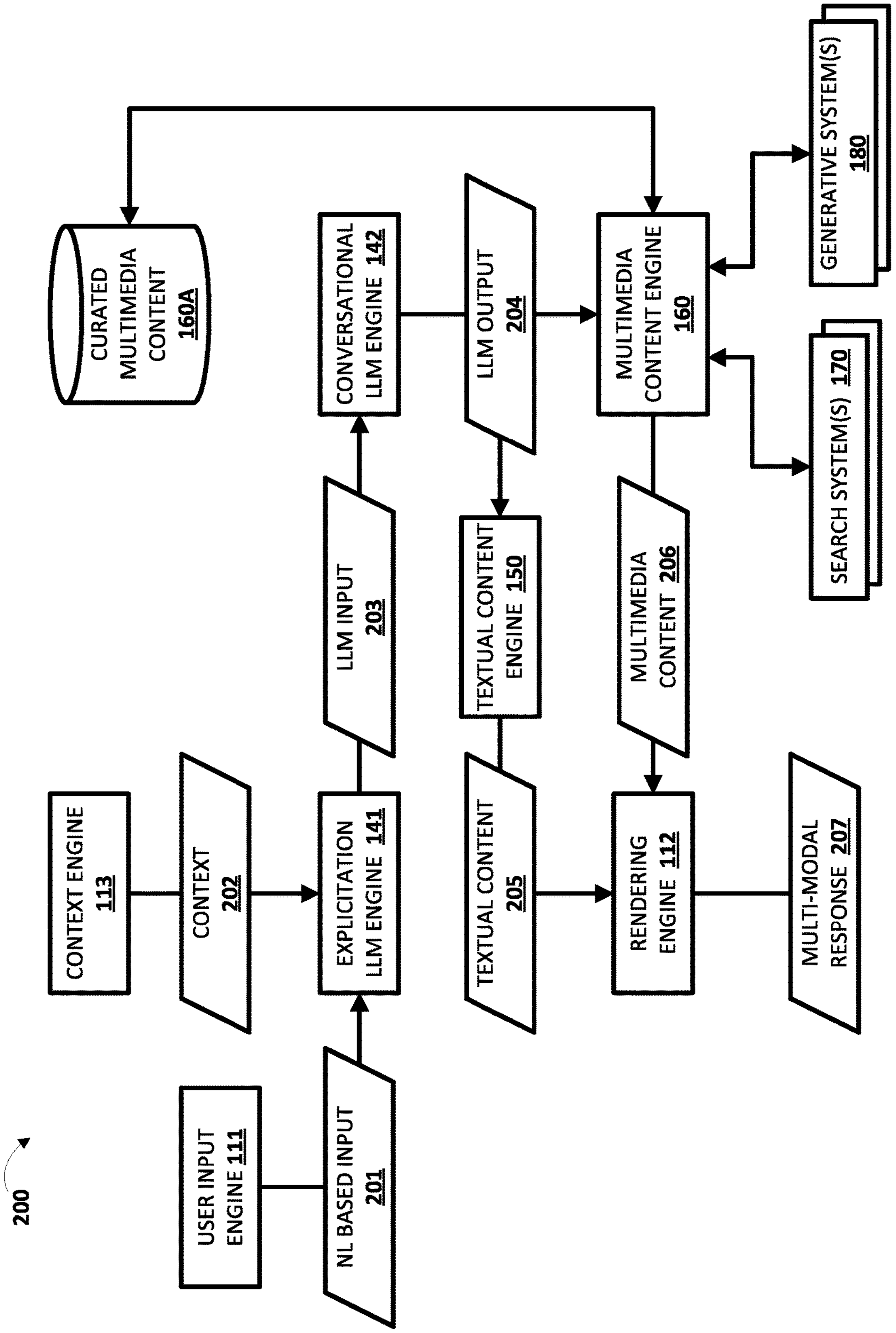
FIG. 2 depicts an example process flow of generating multi-modal response(s) through utilization of large language model(s) (LLM(s)) and other generative model(s) using various components from FIG. 1, in accordance with various implementations.

Turning now to FIG. 2, an example process flow 200 of generating multi-modal response(s) through utilization of large language model(s) (LLM(s)) and other generative model(s) using various components from FIG. 1 is depicted. For the sake of example, assume that the user input engine 111 of the client device detects NL based input 201. For instance, assume that the NL based input 201 is a prompt of "narrate a Kentucky Derby race with Mohammed Ali as the winning jockey riding Secretariat as he uses a Louisville Slugger as a riding crop, and include pictures or a video of the race". Although the process flow 200 of FIG. 2 is described with respect to the NL based input 201 being explicit NL based input, it should be understood that is for the sake of example and is not meant to be limiting. For instance, the NL based input 201 can additionally, or alternatively, be implied NL based input (e.g., as described with respect to the implied input engine 114).

Further assume that the NL based input 201 is provided to the explicitation LLM engine 141. The explicitation LLM 141 can be one form of an LLM that processes the NL based input 201 (and optionally content 202 determined by the content engine 113 of the client device) to generate LLM input 203. The LLM input 203 can then be provided to the conversational LLM engine 142 to generate LLM output 204. Put another way, the explicitation LLM 141 can process the raw NL based input 201 and put it in a structured form that is more suitable for processing by the conversational LLM engine 142. The explicitation LLM and/or the conversational LLM utilized by these respective engines can include, for example, any LLM that is stored in the LLM(s) database 140A, such as PaLM, BARD, BERT, LaMDA, Meena, GPT, and/or any other LLM, such as any other LLM that is encoder-only based, decoder-only based, sequence-to-sequence based and that optionally includes an attention mechanism or other memory, and that is fine-tuned to generate multimedia content tags as described herein (e.g., with respect to FIG. 3). Notably, in generating the LLM input 203, the explicitation engine 141 can also process a prompt that indicates the raw NL based input 201 (and optionally the context 202) should be put in the structured form that is more suitable for processing by the conversational LLM engine 142.

In some implementations, the explicitation LLM engine 141 can generate one or more queries based on the NL based input 201, and submit the query to one or more search systems (e.g., the search system(s) 170), and process the search result document(s) in generating the LLM input 203. Continuing with the above example, the explicitation LLM engine 141 can generate and submit a first query of "Kentucky Derby" to obtain search results indicating that the Kentucky Derby is a horse race on the first Saturday in May at Churchill Downs in Louisville, KY, and is the first race in a series of races for the Triple Crown of Thoroughbred Racing. Further, the explicitation LLM engine 141 can generate and submit a second query of "Mohammed Ali" to determine that he is a former professional boxer from Louisville, KY and one of the largest sports icons of the 20th century. Moreover, the explicitation LLM engine 141 can generate and submit a third query of "Secretariat" to determine that he was the ninth winner of the Triple Crown of Thoroughbred Racing and holds the record for the fastest time in the Kentucky Derby. Furthermore, the explicitation LLM engine 141 can generate and submit a fourth query of "Louisville Slugger" to determine that it is the official baseball bat of Major League Baseball and that they are manufactured in Louisville, KY. Accordingly, not only can this information be included in the LLM input 203 for use in subsequently determining textual content for the narrative, but is can be included in the LLM input 203 for use in subsequently determining multimedia content to be included along with the narrative.

Further, in generating the LLM output 204, the conversational LLM engine 142 can generate the LLM output 204 as, for example, a probability distribution over a sequence of tokens, such as words, phrases, or other semantic units that are predicted to be responsive to the NL based input 201, non-generative multimedia content tags for use in obtaining non-generative multimedia content that is predicted to be responsive to the NL based input 201, and/or generative multimedia content prompts for use in obtaining generative multimedia content that is predicted to be responsive to the NL based input 201. The LLM can include millions or billions of weights and/or parameters that are learned through training the LLM on enormous amounts of diverse data. This enables the LLM to generate the LLM output as the probability distribution over the sequence of tokens. Further, the LLM can be fine-tuned (e.g., as described with respect to FIG. 3) to enable the LLM to generate the LLM output including the sequence of tokens over the non-generative multimedia content tags and/or the generative multimedia content prompts.

Further assume that the LLM output 204 is provided to both the textual content engine 150 and the multimedia content engine 160. In this instance, the textual content engine 150 can determine, based on the probability distribution over the sequence of tokens (e.g., over the words, phrases, or other semantic units), textual content 205 that is to be included in a multi-modal response 207 that is responsive to the NL based input. Continuing with the above example where the NL based input is the prompt of "narrate a Kentucky Derby race with Mohammed Ali as the winning jockey riding Secretariat as he uses a Louisville Slugger as a riding crop, and include pictures or a video of the race", the textual content 205 can include a fictitious story about how Mohammed Ali prepared as a jockey for the Kentucky Derby through a rigorous training regimen with Secretariat, how on the day of the race Mohammed Ali lost his riding crop when the call to the race sounded and instead had to use a Louisville Slugger as a riding crop, a narration of the actual horse race itself as it progressed second-by-second, a description of the bursting emotions as Mohammed Ali trotted into the winner's circle atop Secretariat after the race as they adorned the famous Garland of Roses, and/or other textual content.

Also, in this instance, the multimedia content engine 160 can determine, based on the probability distribution over the sequence of tokens (e.g., over the non-generative multimedia content tags and/or the generative multimedia content prompts), multimedia content 206 that is to be included in the multi-modal response 207 that is responsive to the NL based input 201. As noted above, the conversational LLM utilized by the conversational LLM engine 142 to generate the LLM output 204 can be fine-tuned to generate non-generative multimedia content tags and/or generative multimedia content prompts (e.g., as described with respect to FIG. 3). The multimedia content tag engine 161 can parse the LLM output 204 itself and/or the textual content 205 to identify any non-generative multimedia content tags. Further, the generative multimedia content prompt engine 162 can parse the LLM output 204 itself and/or the textual content 205 to identify any generative multimedia content prompts. Continuing with the above example where the NL based input 201 is the prompt of "narrate a Kentucky Derby race with Mohammed Ali as the winning jockey riding Secretariat as he uses a Louisville Slugger as a riding crop, and include pictures or a video of the race", the LLM output 204 itself and/or the textual content 205 may not include any non-generative multimedia content tags since it is Mohammed Ali was never a jockey for Secretariat during the Kentucky Derby, and there are no images depicting such an event. However, the LLM output 204 itself and/or the textual content 205 may include generative multimedia content prompts to be submitted to various generative model(s) (e.g., an image generator, a video generator, and/or an audio generator) to generate the multi-modal response specifically requested by the user. For instance, the LLM output 204 itself and/or the textual content 205 may include a first generative multimedia content prompt of "{prompt: [image of Mohammed Ali riding Secretariat using a Louisville Slugger as a riding crop] image generator {url: . . . }}", a second generative multimedia content prompt of "{prompt: [video of Mohammed Ali winning the Kentucky Derby while riding Secretariat and using a Louisville Slugger as a riding crop] video generator {url: . . . }}", "{prompt: [narration of horse race where Mohammed Ali wins the Kentucky Derby while riding Secretariat and using a Louisville Slugger as a riding crop] audio generator {url: . . . }}", and/or other generative multimedia content prompts. Notably, in the LLM output 204 itself and/or in the textual content 205, these generative multimedia content prompts may be interleaved with respect to the textual content 205. However, it should be noted that the generative multimedia content prompts are not included in the multi-modal response 207 that is rendered for presentation to the user that provided the NL based input 201. Rather, the generative multimedia content prompts are replaced with the multimedia content 206 corresponding to the generative multimedia content that is generated based on the generative multimedia content prompts.

For instance, the generative multimedia content model selection engine 163 may utilize the generative multimedia content prompts to select, from among a plurality of disparate generative multimedia content prompts, a given generative multimedia content model to process the generative multimedia content prompts. As noted above with respect to FIG. 1, the plurality of disparate generative multimedia content prompts can include first-party generative multimedia content models and/or third-party generative multimedia content prompts. Further, the plurality of disparate generative multimedia content prompts can include image generators, video generators, audio generators, and/or any other generative models capable of processing a prompt to generate multimedia content. Moreover, the plurality of disparate generative multimedia content prompts can include image generators, video generators, audio generators, and/or other generative models of varying sizes (e.g., generative models including billions of parameters (e.g., 100 billion parameters, 250 billion parameters, 500 billion parameters, etc.) or millions of parameters (e.g., 100 million parameters, 250 million parameters, 500 million parameters, etc.)). In particular, the generative multimedia content model selection engine 163 may utilize a type of the generative multimedia content to be generated (e.g., as indicated by the generative multimedia content prompts) to select the given generative multimedia content model to process the generative multimedia content prompts.

Moreover, the multimedia content retrieval engine 164 can cause the generative multimedia content prompts to be submitted to the given generative multimedia content model(s) (e.g., via the generative system(s) 180 and over one or more of the networks 199). In response to the generative multimedia content prompts to be submitted to the given generative multimedia content model(s), the multimedia content retrieval engine 164 can obtain the multimedia content 206 for inclusion in the multi-modal response 207. Notably, the rendering engine 112 can initiate rendering of the textual content 205 prior to the multimedia content 206 being obtained to reduce latency in rendering the multi-modal response 207. In some implementations, the multimedia content engine 160 can cause the client device 110 to issue the generative multimedia content prompts such that the generative multimedia content items are directly obtained by the client device 110, thereby further reducing latency in rendering the multi-modal response 207. Thus, a duration of the human-to-computer interaction between the user and the multi-modal response system 120 can be reduced.

Although the above example is described with respect to the multimedia content items being obtained via the generative system(s) 180, it should be understood that is for the sake of example and is not meant to be limiting. In additional or alternative implementations, the multimedia content items can be obtained from the search system(s) 170 (e.g., image search system(s), video search system(s), audio search system(s), gif search system(s), and/or other multimedia content search systems). In these implementations, the search system utilized to obtain the multimedia content items may be dependent on what type of multimedia content is indicated by the multimedia content tags. In additional or alternative implementations, multimedia content items can be obtained from the curated multimedia content database 160A. In these implementations, the multimedia content retrieval engine 163 can submit the multimedia search queries over the curated multimedia content database 160A if an entity identified in the multimedia content tag is a particular type of entity that, for example, may be considered sensitive, personal, controversial, etc. For instance, if the multimedia content tag indicates that an image of the President of the United States should be included in the multi-modal response 207, then an official presidential headshot from the curated multimedia content database 160A can be obtained as the multimedia content 206. However, it should be understood that whether the LLM output 204 itself and/or the textual content 205 includes the multimedia content tags (rather than the generative multimedia content prompts described above) may be dependent on the NL based input 201 provided by the user, and/or the LLM output 204 and/or the textual content 205 generated by the LLM.

Moreover, although the above example is described with respect to determining that the response that is responsive to the NL based input 201 should be a multi-modal response that includes both the textual content 205 and the multimedia content 206 based on the LLM output 204 and/or the textual content 205 including the multimedia content tags, it should be understood that is for the sake of example and is not meant to the be limiting. Rather, it should be understood other signals can be utilized (e.g., as described with respect to FIG. 4), such as an explicit intent or inferred intent that the response should be a multi-modal response and/or other contextual signals associated with the client device of the user and/or the user. In implementations where it is determined that the response that is responsive to the NL based input 201 should be a multi-modal response that includes both the textual content 205 and the multimedia content 206 prior to the NL based input being processed by the explicitation LLM engine 141, the explicitation engine 141 can also process a prompt that indicates the response should be a multi-modal response.

Figure 3:
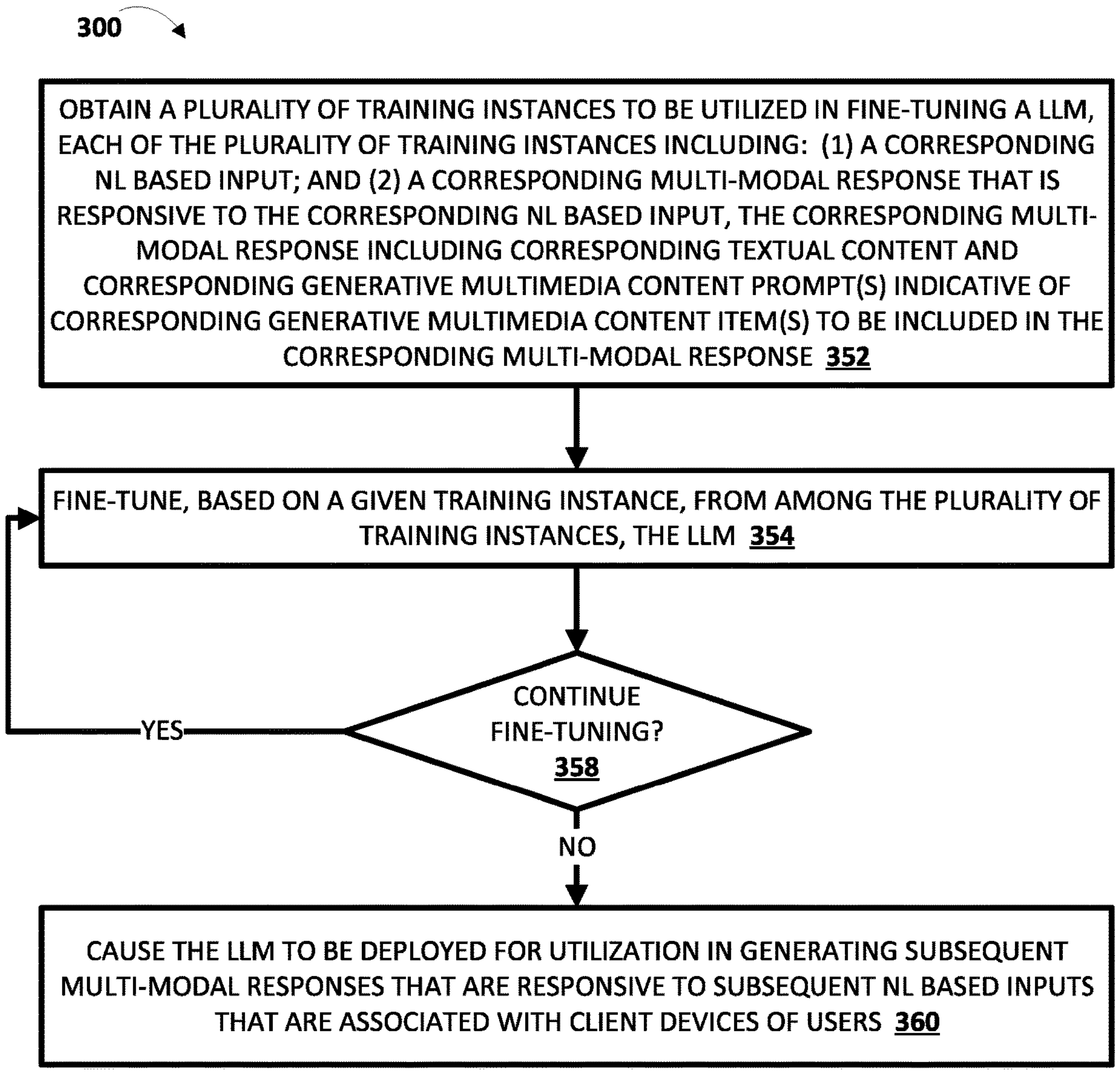
FIG. 3 depicts a flowchart illustrating an example method of fine-tuning a large language model (LLM) to generate multi-modal response(s) using other generative model(s), in accordance with various implementations.

Turning now to FIG. 3, a flowchart illustrating an example method 300 of fine-tuning a large language model (LLM) to generate multi-modal response(s) using other generative model(s) is depicted. For convenience, the operations of the method 300 are described with reference to a system that performs the operations. This system of the method 300 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 300 are shown in a particular order, this is not meant to be limiting. One or more operations may be reordered, omitted, and/or added.

At block 352, the system obtains a plurality of training instance to be utilized in fine-tuning a LLM, each of the plurality of training instances including: (1) a corresponding NL based input; and (2) a corresponding multi-modal response that is responsive to the corresponding NL based input, the corresponding multi-modal response including corresponding textual content and corresponding generative multimedia content prompt(s) indicative of corresponding generative multimedia content item(s) to be included in the corresponding multi-modal response. For example, the system can cause the training instance engine 131 from FIG. 1 to obtain the plurality of training instances. In some implementations, one or more of the plurality of training instances can be curated by, for example, a developer that is associated with the multi-modal response system 120 from FIG. 1. For instance, the corresponding NL based input and the corresponding textual content of the multi-modal response can be obtained from conversation logs, and the developer can manually add the corresponding generative multimedia content prompt(s) into the textual content where the corresponding generative multimedia content item(s) should be included in the multi-modal response (e.g., with respect to an arrangement of the corresponding textual content). In additional or alternative implementations, one or more of the plurality of training instances can be generated using an automated process. For instance, the corresponding NL based input and the corresponding textual content of the multi-modal response can be obtained from conversation logs, and the corresponding generative multimedia content prompt(s) can be automatically inserted into the corresponding textual content where the corresponding generative multimedia content item(s) should be included in the multi-modal response. Upon being obtained and/or generated, the training instance engine 131 from FIG. 1 can store the plurality of training instances in the training instance(s) database 130A from FIG. 1.

Although the operations of block 352 are described with respect to obtaining a plurality of training instances to be utilized in fine-tuning the LLM to generate the generative multimedia content prompt(s) for the generative multimedia content item(s), it should be understood that is for the sake of example and is not meant to be limiting. For instance, the operations of block 352 may additionally, or alternatively, obtain a plurality of additional training instances to be utilized in fine-tuning the LLM to generate multimedia content tag(s) for non-generative multimedia content item(s). In these instances, each of the plurality of additional training instances may include: (1) a corresponding NL based input; and (2) a corresponding multi-modal response that is responsive to the corresponding NL based input, the corresponding multi-modal response including corresponding textual content and corresponding multimedia content tag(s) indicative of corresponding multimedia content item(s) to be included in the corresponding multi-modal response.

For example, the system can cause the training instance engine 131 from FIG. 1 to obtain the plurality of training instances. In some implementations, one or more of the plurality of training instances can be curated by, for example, a developer that is associated with the multi-modal response system 120 from FIG. 1. For instance, the corresponding NL based input and the corresponding textual content of the multi-modal response can be obtained from conversation logs, and the developer can manually add the corresponding multimedia content tag(s) into the textual content where the corresponding multimedia content item(s) should be included in the multi-modal response. In additional or alternative implementations, one or more of the plurality of training instances can be generated using an automated process. For instance, the corresponding NL based input and the corresponding textual content of the multi-modal response can be obtained from conversation logs, and the corresponding multimedia content tag(s) can be automatically inserted into the textual content where the corresponding multimedia content item(s) should be included in the multi-modal response. Upon being obtained and/or generated, the training instance engine 131 from FIG. 1 can store the plurality of training instances in the training instance(s) database 130A from FIG. 1.

Notably, the corresponding generative multimedia content prompt(s) that are included in each of the training instances may be more detailed than the corresponding multimedia content tag(s) included in each of the additional training instances. This subsequently enables the LLM to generate detailed prompts related to various concepts included in NL based inputs. For instance, if the NL based input for a given training instance is "I'm planning a trip to Rome next summer, what are the must-see attractions?", then the corresponding textual content can include information about "The Colosseum in Rome" followed by a multimedia content tag of "{tag: [image of The Colosseum in Rome] image {url: . . . }}" and followed by additional corresponding textual content that is responsive to the NL based input. Notably, the multimedia content tag does not include a lot of detail since typical search system(s) (e.g., an image search system of the search system(s) 170) can easily obtain an image of "The Colosseum in Rome" by performing a simple image search using the terms "The Colosseum in Rome" for an image query. In contrast, if the NL based input for a given training instance is "narrate a Kentucky Derby race with Mohammed Ali as the winning jockey riding Secretariat as he uses a Louisville Slugger as a riding crop, and include pictures or a video of the race", then the corresponding textual content can include a fictitious story about how Mohammed Ali prepared as a jockey for the Kentucky Derby through a rigorous training regimen with Secretariat followed by a generative multimedia content prompt of "{prompt: [generate an image of Mohammad Ali breezing Secretariat with the Twin Spires of Churchill Downs in the background during the month of May] image generator {url: . . . }}" and followed by additional corresponding textual content that is responsive to the NL based input. Notably, the generative multimedia content prompt does include a lot of detail since typical generative system(s) (e.g., an image generative of the generative system(s) 180) typical require more information that typical search system(s) to accurately reflect a scenario included in an NL based input.

At block 354, the system fine-tunes, based on a given training instance, from among the plurality of training instances, the LLM. For example, the training engine 132 from FIG. 1 can obtain the given training instance from the training instance(s) database 130A. Further, the training engine 132 can cause the LLM to process the corresponding NL based input and the corresponding multi-modal response of the given training instance. Notably, since the corresponding multi-modal response includes the corresponding generative multimedia content prompt(s) indicative of the corresponding generative multimedia content item(s) to be included in the corresponding multi-modal response (or the corresponding multimedia content tag(s) indicative of the corresponding multimedia content item(s) to be included in the corresponding multi-modal response), the LLM is effectively fine-tuned to perform a specific task of determining when to include the corresponding generative multimedia content prompt(s) (or the corresponding multimedia content tag(s)) and where to include them with respect to the corresponding textual content. Notably, the LLM that is being fine-tuned can be the conversational LLM that is utilized by the conversational LLM engine 142 from FIG. 1.

At block 358, the system determines whether to continue fine-tuning the LLM. The system can determine to continue fine-tuning the LLM until one or more conditions are satisfied. The one or more conditions can include, for example, whether the LLM has been fine-tuned based on a threshold quantity of training instances, whether a threshold duration of time has passed since the fine-tuning process began, whether performance of the LLM has achieved a threshold level of performance, and/or other conditions.

If, at an iteration of block 358, the system determines to continue fine-tuning the LLM, then the system returns to block 354. At a subsequent iteration of block 354, the system fine-tunes, based on a given additional training instance, from among the plurality of training instances, the LLM. The system can continue fine-tuning the LLM in this manner until the one or more conditions are satisfied at subsequent iterations of block 358.

If, at an iteration of block 358, the system determines not to continue fine-tuning the LLM, then the system proceeds to block 360. At block 360, the system causes the LLM to be deployed for utilization in generating multi-modal responses that are responsive to subsequent NL based inputs that are associated with client devices of users (e.g., as described with respect to FIG. 4).

Figure 4:
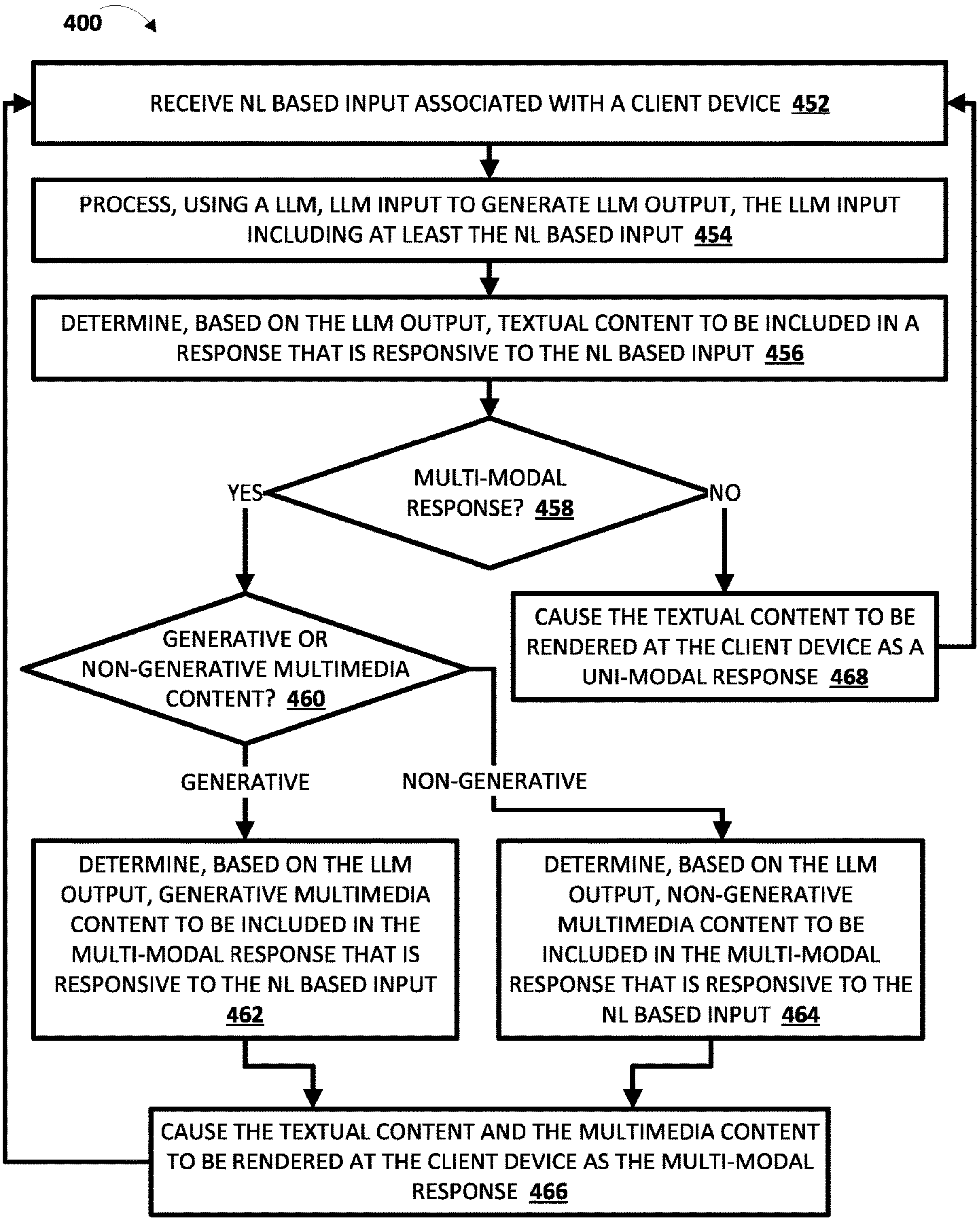
FIG. 4 depicts a flowchart illustrating an example method of generating multi-modal response(s) through utilization of large language model(s) (LLM(s)) and other generative model(s), in accordance with various implementations.

Turning now to FIG. 4, a flowchart illustrating an example method 400 of generating multi-modal response(s) through utilization of large language model(s) (LLM(s)) and other generative model(s) is depicted. For convenience, the operations of the method 400 are described with reference to a system that performs the operations. This system of the method 400 includes one or more processors, memory, and/or other component(s) of computing device(s) (e.g., client device 110 of FIG. 1, multi-modal response system 120 of FIG. 1, computing device 610 of FIG. 6, one or more servers, and/or other computing devices). Moreover, while operations of the method 400 are shown in a particular order, this is not meant to be limiting. One or more operations may be reordered, omitted, and/or added.

At block 452, the system receives NL based input associated with a client device. The NL based input can be any explicit NL based input (e.g., described with respect to the user input engine 111 from FIG. 1) or implicit NL based input (e.g., described with respect to the implied input engine 114 from FIG. 1) described herein.

At block 454, the system processes, using a LLM, LLM input to generate LLM output, the LLM input including at least the NL based input. In some implementations, the system can cause the explicitation LLM engine 141 from FIG. 1 to process the raw NL based input (and optionally any context or other prompts), using an explicitation LLM (e.g., stored in the LLM(s) database 140A from FIG. 1), to generate the LLM input. In these implementations, the system can cause the conversational LLM engine 142 from FIG. 1, to process, using a conversational LLM (e.g., stored in the LLM(s) database 140A from FIG. 1 and fine-tuned according to the method 300 of FIG. 3), the LLM input to generate the LLM output. However, in various implementations, the explicitation LLM engine 141 from FIG. 1 can be omitted, and the LLM input can correspond to the raw NL based input (and optionally any context or other prompts). As noted above with respect to the process flow 200 of FIG. 2, the LLM output can include, for example, a probability distribution over a sequence of tokens, such as words, phrases, or other semantic units, and optionally generative multimedia content prompt(s) for generative multimedia content item(s) and/or multimedia content tag(s) for non-generative multimedia content item(s) that are predicted to be responsive to the NL based input. The LLM can include millions or billions of weights and/or parameters that are learned through training the LLM on enormous amounts of diverse data. This enables the LLM to generate the LLM output as the probability distribution over the sequence of tokens.

At block 456, the system determines, based on the LLM output, textual content to be included in a response that is responsive to the NL based input. For example, the system can cause the textual content engine 150 from FIG. 1 to determine the textual content (e.g., as described with respect to the process flow 200 of FIG. 2).

At block 458, the system determines whether to generate a multi-modal response that is responsive to the NL based input. In some implementations, the system can determine to generate a multi-modal response that is responsive to the NL based input in response to determining that the LLM output generated at block 454 includes generative multimedia content prompt(s) for generative multimedia content item(s) and/or multimedia content tag(s) for non-generative multimedia content item(s). In additional or alternative implementations, the system can determine to generate a multi-modal response that is responsive to the NL based input in response to determining that the textual content determined at block 456, that is determined based on the LLM output, includes generative multimedia content prompt(s) for generative multimedia content item(s) and/or multimedia content tag(s) for non-generative multimedia content item(s). However, it should be understood that these are only two signals contemplated herein, and are not meant to be limiting.

For example, the system can additionally, or alternatively, determine whether to generate a multi-modal response that is responsive to the NL based input prior to the LLM input being processed by the LLM. For instance, the system can determine whether to generate a multi-modal response that is responsive to the NL based input based on a client device context associated with the client device from which the NL based input is received. In these instances, the client device context can include a display size of a display of the client device of the user, network bandwidth of the client device of the user, connectivity status of the client device of the user, a modality by which the NL based input was received, and/or other client device contexts. The client device context can, for instance, serve as a proxy for whether the client device is capable of efficiently rendering multimedia content (e.g., in view of bandwidth and/or connectivity considerations), whether the client device is well suited for rendering different types of multimedia content (e.g., whether the client device includes speaker(s) and/or a display), and/or otherwise indicate whether a multi-modal response should be generated.

Also, for instance, the system can determine whether to generate a multi-modal response that is responsive to the NL based input based on a user context of a user associated with the client device from which the NL based input is received. In these instances, the user context can include a geographical region in which the user is located when the NL based input is received, a user account status of a user account of the user of the client device, historical NL based inputs provided by the user of the client device, or user preferences of the user of the client device, and/or other user contexts. The user context can, for instance, serve as a proxy for whether the user desires multi-modal responses (or desires multi-modal responses in certain situations) and/or otherwise indicate whether a multi-modal response should be generated. In all of the above instances, the system can cause the NL based input and/or the LLM input to be augmented with a prompt that indicates a multi-modal response that includes multimedia content should be generated.

If, at an iteration of block 458, the system determines to generate a multi-modal response that is responsive to the NL based input, then the system proceeds to block 460. At block 460, the system determines whether the multi-modal response should include generative multimedia content or non-generative multimedia content. In some implementations, the system can determine whether the multi-modal response should include generative multimedia content or non-generative multimedia content based on, for example, whether the LLM output and/or the textual content includes generative multimedia content prompt(s) for generative multimedia content item(s) and/or multimedia content tag(s) for non-generative multimedia content item(s) that are predicted to be responsive to the NL based input. For instance, if the LLM output and/or the textual content includes generative multimedia content prompt(s) for generative multimedia content item(s), then the system can determine the multi-modal response should include generative multimedia content. Also, for instance, if the LLM output and/or the textual content includes multimedia content tag(s) for non-generative multimedia content item(s), then the system can determine the multi-modal response should include non-generative multimedia content. In additional or alternative implementations, the system can determine whether the multi-modal response should include generative multimedia content or non-generative multimedia content based on, for example, whether NL based input is associated with an imaginary concept or a real-world concept. For instance, if the NL based input is associated with an imaginary concept (such an event from the past that did not happen, a person that does not exist in the real-world, an animal that does not exist in the real-world, a place that does not exist in the real-world, a business that does not exist in the real-world, and/or other imaginary concepts), then the system can determine that the multi-modal response should include generative multimedia content. Also, for instance, if the NL based input is associated with a real-world concept (such an event from the past that did happen, a person that does exist in the real-world, an animal that does exist in the real-world, a place that does exist in the real-world, a business that does exist in the real-world, and/or other real-world concepts), then the system can determine that the multi-modal response should include non-generative multimedia content.

If, at an iteration of block 460, the system determines the multi-modal response should include generative multimedia content, then the system proceeds to block 462. At block 462, the system determines, based on the LLM output, generative multimedia content to be included in the multi-modal response that is responsive to the NL based input. For example, the system can cause the multimedia content engine 160 from FIG. 1 to determine the generative multimedia content (e.g., as described with respect to the process flow 200 of FIG. 2 and through utilization of the generative system(s) 180). The system proceeds to block 466. Block 466 is described in more detail below.

If, at an iteration of block 460, the system determines the multi-modal response should include non-generative multimedia content, then the system proceeds to block 464. At block 464, the system determines, based on the LLM output, non-generative multimedia content to be included in the multi-modal response that is responsive to the NL based input. For example, the system can cause the multimedia content engine 160 from FIG. 1 to determine the non-generative multimedia content (e.g., as described with respect to the process flow 200 of FIG. 2 and through utilization of the search system(s) 170). The system proceeds to block 466.

At block 466, the system causes the textual content and the multimedia content (e.g., whether generative multimedia content or non-generative multimedia content) to be rendered at the client device as the multi-modal response. For example, the textual content can be visually rendered at a display of the client device of the user. Further, the multimedia content can be visually rendered at the display of the client device of the user (e.g., in instances where the multimedia content includes visual content) and/or audibly rendered via speaker(s) of the client device of the user (e.g., in instances where the multimedia content includes audible content). Various non-limiting examples of causing the textual content and the multimedia content to be rendered at the client device as the multi-modal response are described herein (e.g., with respect to FIGS. 5A and 5B). The system returns to block 452 to wait for additional NL based input associated with the client device to be received to perform an additional iteration of the method 400.

If, at an iteration of block 458, the system determines not to generate a multi-modal response that is responsive to the NL based input, then the system proceeds to block 468. At block 468, the system causes the textual content to be rendered at the client device as a uni-modal response. For example, the textual content can be visually rendered at a display of the client device of the user. The system returns to block 452 to wait for additional NL based input associated with the client device to be received to perform an additional iteration of the method 400.

Although the method 400 is described with respect to determining whether the multi-modal response should include generative multimedia content or non-generative multimedia content, it should be understood that is for the sake of example and is not meant to be limiting. Rather, it should be understood that the multi-modal response can include both generative multimedia content and non-generative multimedia content. In these instances, the system can proceed to both blocks 462 and 464 in a parallel manner.

Figure 5A:
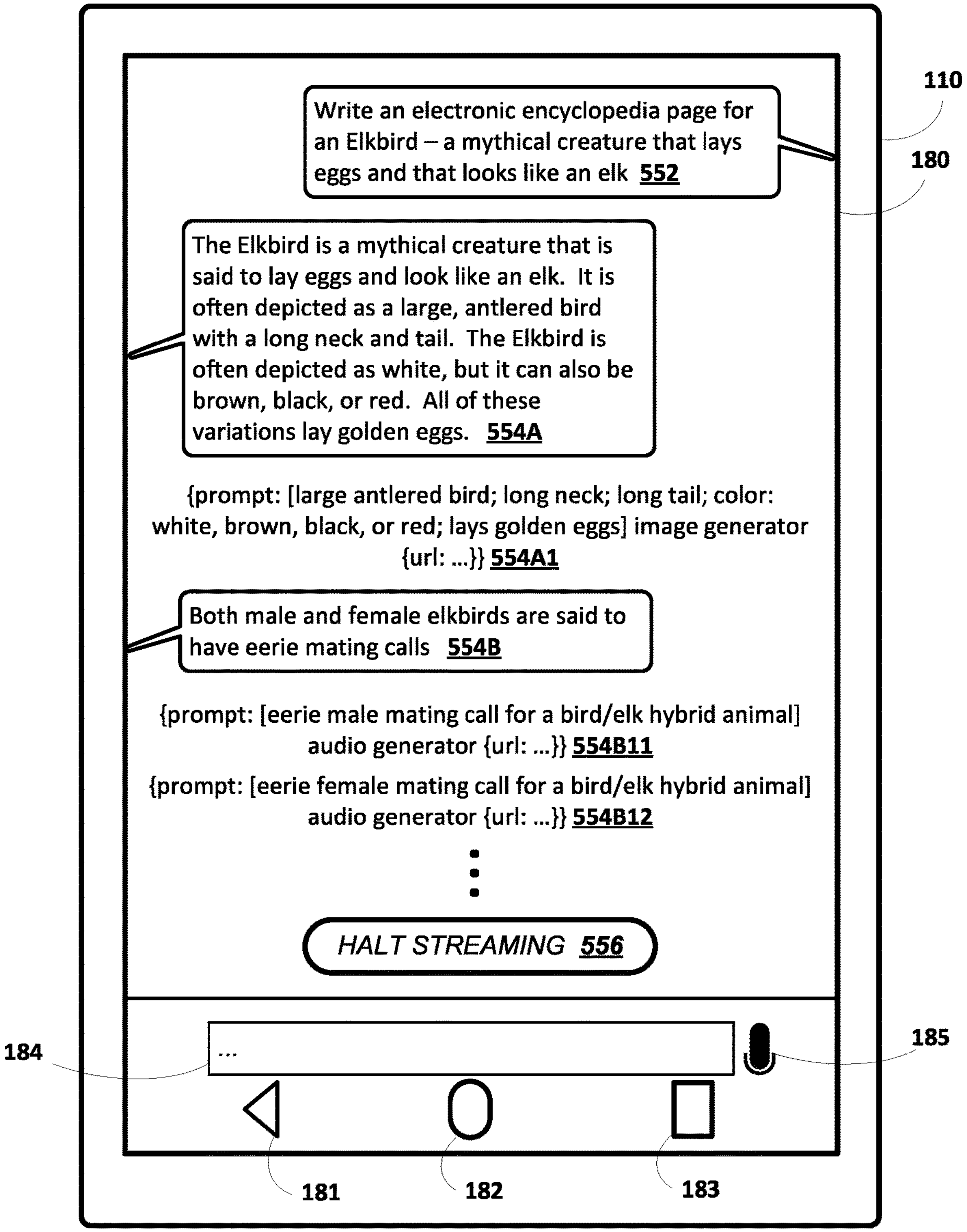
FIG. 5A and FIG. 5B depict various non-limiting examples of generating multi-modal response(s) through utilization of large language model(s) (LLM(s)) and other generative model(s), in accordance with various implementations.
Figure 5B:
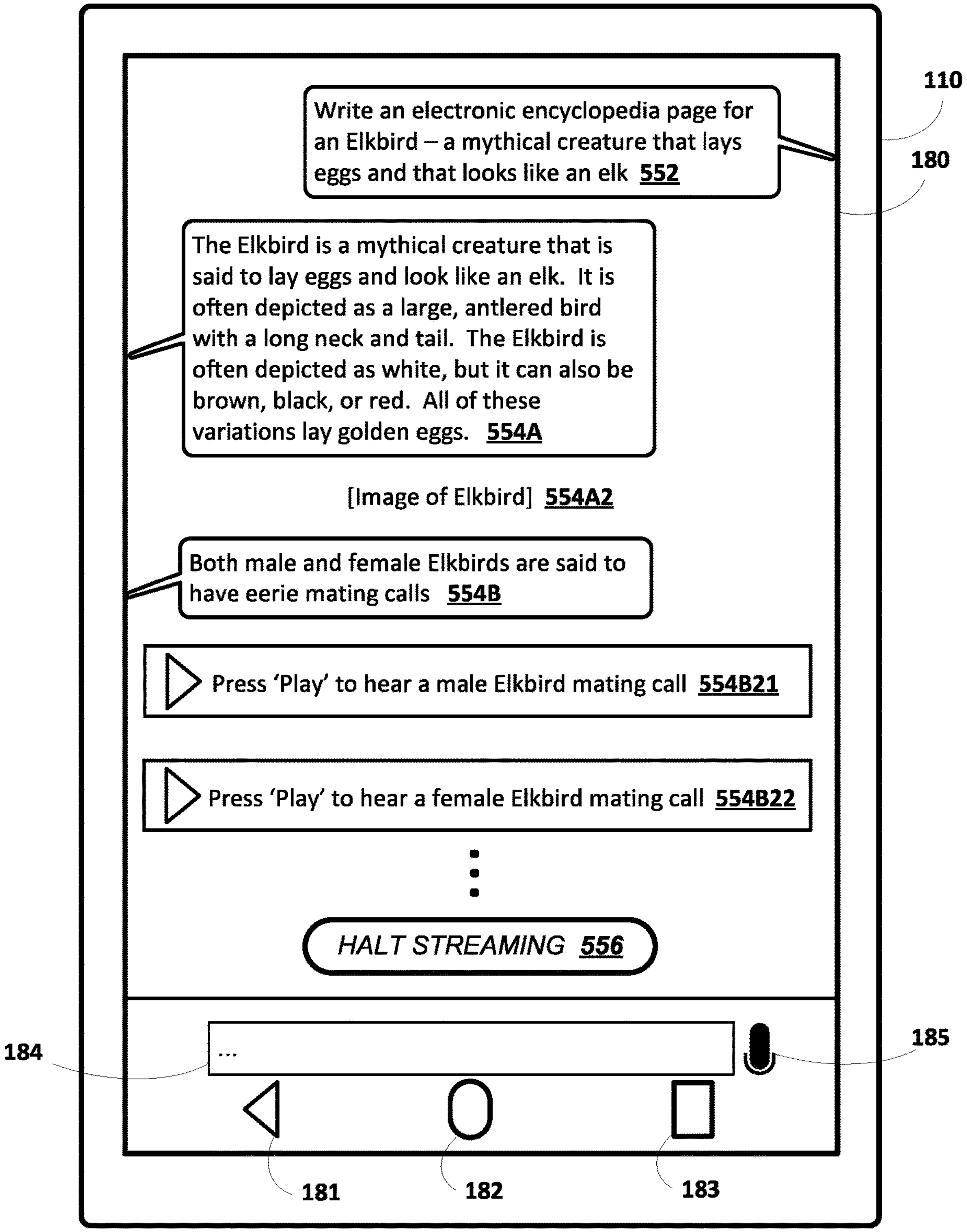

Turning now to FIGS. 5A and 5B, various non-limiting examples of generating multi-modal response(s) through utilization of large language model(s) (LLM(s)) and other generative model(s) are depicted. The client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 180 to visually render visual output. Further, the display 180 of the client device 110 can include various system interface elements 181, 182, and 183 (e.g., hardware and/or software interface elements) that may be interacted with by a user of the client device 110 to cause the client device 110 to perform one or more actions. The display 180 of the client device 110 enables the user to interact with content rendered on the display 180 by touch input (e.g., by directing user input to the display 180 or portions thereof (e.g., to a text entry box 184, to a keyboard (not depicted), or to other portions of the display 180)) and/or by spoken input (e.g., by selecting microphone interface element 185—or just by speaking without necessarily selecting the microphone interface element 185 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 5A and 5B is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Referring specifically to FIG. 5A, for the sake of example, assume that a user of the client device 110 provides NL based input 552 of "Write an electronic encyclopedia page for an Elkbird-a mythical creature that lays eggs and that looks like an elk". Further assume that a system (e.g., the multi-modal response system 120 from FIG. 1) processes at least the NL based input 552 using an LLM (e.g., that is fine-tuned as described with respect to FIG. 3) to generate LLM output for a multi-modal response (e.g., as described with respect to FIGS. 2 and 4). For instance, assume that the LLM output for the multi-modal response includes a plurality of textual segments, including at least a first textual segment 554A that provides a general description of the appearance of the Elkbird, and a second textual segment 554B that provides a general description of the mating calls for Elkbirds. Further assume that the LLM output for the multi-modal response includes a plurality of generative multimedia content prompts including at least a first generative multimedia content prompt 554A1 that is associated with the first textual segment 554A, a second generative multimedia content prompt 554B11 that is associated with the second textual segment 554B, and a third generative multimedia content prompt 554B11 that is also associated with the second textual segment 554B.

Notably, the generative multimedia content prompts 554A1, 554B11, and 554B12 are interleaved with respect to the corresponding textual segments 554A and 554B such that the first generative multimedia content prompt 554A1 is included after the first textual segment 554A and are associated with the appearance of the Elkbird, the second and third generative multimedia content prompts 554B11 and 554B12 are included after the second textual segment 554B and are both are associated with the mating calls for Elkbirds. However, it should be understood that in various implementations, the generative multimedia content prompts 554A1, 554B11, and 554B12 are not rendered (e.g., visually and/or audibly) for presentation to the user such that they are not perceivable by the user. Rather, the generative multimedia content prompts 554A1, 554B11, and 554B12 serve as a placeholder for where the generative multimedia content will be inserted into the multi-modal response once it is obtained.

For example, referring specifically to FIG. 5B, and continuing with the above example, the first generative multimedia content prompt 554A1 that is associated with the first textual segment 554A can be replaced with an image of the Elkbird as indicated by 554A2, the second generative multimedia content prompt 554B11 that is associated with a mating call of a male Elkbird can be replaced with a generative audio clip as indicated by 554B21, and the third generative multimedia content prompt 554B12 that is associated with a mating call of a female Elkbird can be replaced with a generative audio clip as indicated by 554B22.

Notably, the corresponding textual segments 554A and 554B can be visually and/or audibly rendered for presentation to the user as they are obtained by the client device 110, and prior to the generative multimedia content being obtained. Put another way, the client device 110 can stream the corresponding textual segments 554A and 554B as it is obtained, but leave space to insert the generative multimedia content as it is obtained. This enables latency in rendering of the multi-modal response to be reduced. Further, a halt streaming selectable element 556 can be provided and, when selected, any streaming of the multi-modal response can be halted to further preserve computational resources if the user decides to no longer receive the multi-modal response.

Further, in some implementations, the generative multimedia content items can be rendered along with an indication of a corresponding source of each for the generative multimedia content (e.g., a uniform resource locator (URL) or the like). Moreover, in some implementations, each of the generative multimedia content items (or the indication of the corresponding sources) can be selectable and, when selected, can cause the client device 110 to navigate (e.g., via a web browser or other application accessible via the application engine 115) to the corresponding generative model(s) utilized in generating the generative multimedia content items. For instance, if the user selects the image of the Elkbird as indicated by 554A2, the client device 110 can navigate to the image generator utilized to generate the image of the Elkbird (and optionally be presented with the generative multimedia content prompt that was utilized to generate the image of the Elkbird). Further, if the user selects the audio of one of the mating calls of the Elkbird (e.g., aside from pressing 'Play' to hear the mating calls of the Elkbird) of the Elkbird as indicated by 554B21 or 554B22, the client device 110 can navigate to the audio generator utilized to generate the audio for the mating calls of the Elkbird (and optionally be presented with the generative multimedia content prompt that was utilized to generate the audio of the mating calls of the Elkbird).

Although FIGS. 5A and 5B are described with respect to the multimedia content included in the multi-modal response being generative multimedia content, it should be understood that is for the sake of example and is not meant to be limiting. In additional or alternative implementations, the multimedia content can include non-generative multimedia content that is obtained via multimedia content tags associated with non-generative multimedia content items.

Figure 6:
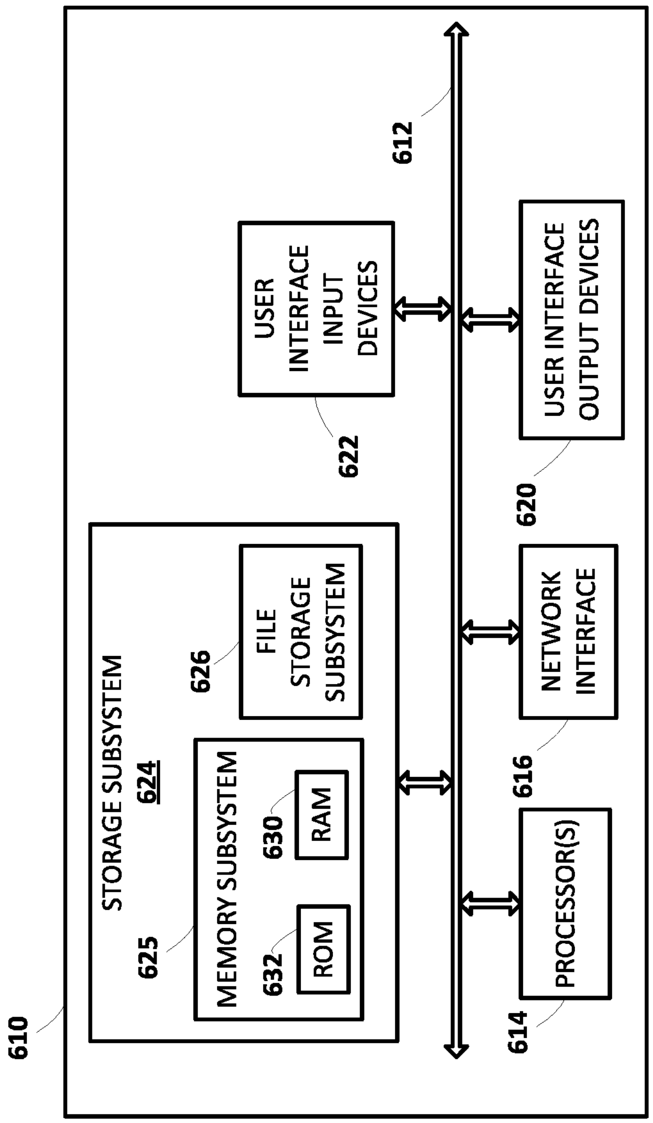
FIG. 6 depicts an example architecture of a computing device, in accordance with various implementations.

Turning now to FIG. 6, a block diagram of an example computing device 610 that may optionally be utilized to perform one or more aspects of techniques described herein is depicted. In some implementations, one or more of a client device, multi-modal response system component(s) or other cloud-based software application component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIGS. 1 and 2.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving natural language (NL) based input associated with a client device of a user; and generating a multi-modal response that is responsive to the NL based input. Generating the multi-modal response that is responsive to the NL based input includes: processing, using a large language model (LLM), LLM input to generate LLM output, the LLM input including at least the NL based input; determining, based on the LLM output, textual content for inclusion in the multi-modal response and a generative multimedia content prompt that is indicative of generative multimedia content that is to be included in the multi-modal response; and obtaining, based on the generative multimedia content prompt the generative multimedia content for inclusion in the multi-modal response. The method further includes causing the multi-modal response to be rendered at the client device of the user.

These and other implementations of technology disclosed herein can optionally include one or more of the following features.

In some implementations, obtaining the generative multimedia content for inclusion in the multi-modal response based on the generative multimedia content prompt may include: submitting, to a generative multimedia content model, the generative multimedia content prompt; and in response to submitting the generative multimedia content prompt to the generative multimedia content model, obtaining the generative multimedia content.

In some versions of those implementations, the method may further include: determining, based on the generative multimedia content prompt, a type of the generative multimedia content that is to be included in the multi-modal response; and selecting, based on the type of the generative multimedia content, the generative multimedia content model, and from among a plurality of disparate generative multimedia content models, the generative multimedia content model to be utilized in obtaining the generative multimedia content.

In some further versions of those implementations, the type of the generative multimedia content that is to be included in the multi-modal response may include generative image content, and the generative multimedia content model that is selected may be a generative image content model.

In additional or alternative further versions of those implementations, the type of the generative multimedia content that is to be included in the multi-modal response may include generative video content, and the generative multimedia content model that is selected may be a generative video content model.

In additional or alternative further versions of those implementations, the type of the generative multimedia content that is to be included in the multi-modal response may include generative audio content, and the generative multimedia content model that is selected may be a generative audio content model.

In additional or alternative further versions of those implementations, the type of generative multimedia content that is to be included in the multi-modal responses may include two or more of: generative image content, generative video content, or generative audio content.

In additional or alternative versions of those implementations, the LLM may be managed by a first-party entity, and the generative multimedia content model may be managed by the first-party entity.

In additional or alternative versions of those implementations, the LLM may be managed by a first-party entity, the generative multimedia content model may be managed by the third-party entity, and the third-party entity that manages the generative multimedia content model may be distinct from the first-party entity that manages the LLM.

In some implementations, the textual content that is included in the multi-modal response may include a plurality of textual segments, and the generative multimedia content that is included in the multi-modal response may include a generative multimedia content item that is interleaved between a first textual segment, of the plurality of textual segments, and a second textual segment, of the plurality of textual segments.

In some versions of those implementations, the method may further include replacing, in the multi-modal response, the generative multimedia content prompt with the multimedia content item.

In additional or alternative versions of those implementations, the method may further include: determining, based on the LLM output, an additional generative multimedia content prompt that is indicative of additional generate multimedia content that is to be included in the multi-modal response; and obtaining, based on the additional generative multimedia content prompt, the additional generative multimedia content for inclusion in the multi-modal response.

In additional or alternative versions of those implementations, the additional generative multimedia content that is included in the multi-modal response may include an additional generative multimedia content item that is interleaved between the second textual segment, of the plurality of textual segments, and a third textual segment, of the plurality of textual segments.

In some further versions of those implementations, an additional type of the additional generative multimedia content may differ from a type of the generative multimedia content.

In additional or alternative further versions of those implementations, the method may further include replacing, in the multi-modal response, the additional generative multimedia content prompt with the additional generative multimedia content item.

In some implementations, the method may further include: determining whether to include the generative multimedia content in the multi-modal response. Determining whether to include the generative multimedia content in the multi-modal response may be in response to determining that the LLM output includes the generative multimedia content prompt.

In some implementations, the method may further include: determining whether to include the generative multimedia content in the multi-modal response. Determining whether to include the generative multimedia content in the multi-modal response may be in response to determining that the NL based input includes a corresponding intent associated with causing the generative multimedia content to be provided.

In some implementations, the method may further include: determining whether to include the generative multimedia content in the multi-modal response. Determining whether to include the generative multimedia content in the multi-modal response may be based on a client device context associated with the client device of the user or a user context associated with the user of the client device.

In some versions of those implementations, the client device context associated with the client device of the user may include one or more of: a display size of a display of the client device of the user, network bandwidth of the client device of the user, connectivity status of the client device of the user, or a modality by which the NL based input was received.

In additional or alternative versions of those implementations, the user context associated with the user of the client device may include one or more of: a geographical region in which the user is located when the NL based input is received, a user account status of a user account of the user of the client device, historical NL based inputs provided by the user of the client device, or user preferences of the user of the client device.

In some implementations, the method may further include, prior to processing the LLM input to generate the LLM output using the LLM: processing, using an explicitation LLM, the NL based input and one or more historical NL based inputs provided by the user of the client device to generate the LLM input.

In some implementations, the method may further include: further processing, using the explicitation LLM, a client device context associated with the client device of the user and/or a user context associated with the user of the client device to generate the LLM input.

In some implementations, the LLM input may further include a prompt that indicates the generative multimedia content should be included in the multi-modal response.

In some implementations, the NL based input may not explicitly include a request that any generative multimedia content be rendered at the client device of the user.

In some implementations, the generative multimedia content prompt that is indicative of generative multimedia content that is to be included in the multi-modal response may not be rendered at the client device of the user.

In some implementations, causing the multi-modal response to be rendered at the client device of the user may include: causing the textual content to be visually rendered via a display of the client device; and causing the generative multimedia content to be visually rendered via the display of the client device and/or audibly rendered via one or more speakers of the client device.

In some versions of those implementations, causing the textual content to be visually rendered may be while the generative multimedia content is being obtained, and causing the generative multimedia content to be visually rendered and/or audibly rendered may be in response to the generative multimedia content being obtained.

In additional or alternative versions of those implementations, the generative multimedia content may be visually rendered and/or audibly rendered along with a corresponding source of the generative multimedia content.

In some further versions of those implementations, the generative multimedia content may be selectable, and, when the generative multimedia content is selected, the client device may navigate to the corresponding source of the generative multimedia content.

In some implementations, the method may further include: determining, based on the LLM output, whether the multi-modal response should include the generative multimedia content or non-generative multimedia content. Obtaining the generative multimedia content for inclusion in the multi-modal response may be in response to determining that the LLM output includes the generative multimedia content prompt and in lieu of a non-generative multimedia content tag.

In some versions of those implementations, the method may further include, in response to determining that the LLM output includes the non-generative multimedia content tag: obtaining, based on the non-generative multimedia content tag, non-generative multimedia content that is to be included in the multi-modal response.

In additional or alternative versions of those implementations, the LLM output may include the generative multimedia content prompt when the NL based input is associated with an imaginary concept.

In some further versions of those implementations, the LLM output may include the non-generative multimedia content tag when the NL based input is associated with a real-world concept.

In some implementations, the method may further include, prior to receiving the NL based input associated with the client device of the user: fine-tuning, based on a plurality of training instances, the LLM.

In some versions of those implementations, each training instance, of the plurality of training instance, includes: a corresponding natural language (NL) based input, and a corresponding multi-modal response that is responsive to the corresponding NL based input, the corresponding multi-modal response including corresponding textual content and one or more corresponding generative multimedia content prompts, each of the one or more generative multimedia content prompts being indicative of corresponding generative multimedia content that is to be included in the corresponding multi-modal response.

In some implementations, a method implemented by one or more processors is provided, and includes: receiving natural language (NL) based input associated with a client device of a user; and generating a multi-modal response that is responsive to the NL based input. Generating the multi-modal response that is responsive to the NL based input includes: processing, using a large language model (LLM), LLM input to generate LLM output, the LLM input including at least the NL based input; and determining, based on the LLM output, textual content for inclusion in the multi-modal response and generative multimedia content for inclusion in the multi-modal response. The textual content includes a plurality of textual segments to be included in the multi-modal responses, and the generative multimedia content is indicative of a generative multimedia content item to be included in the multi-modal response. The method further includes causing the multi-modal response to be rendered at the client device of the user. Causing the multi-modal response to be rendered at the client device of the user includes: causing the plurality of textual segments to be visually rendered via a display of the client device; and causing the generative multimedia content item to be visually rendered via the display of the client device and/or via one or more speakers of the client device. The generative multimedia content item is interleaved between a first textual segment, of the plurality of textual segments, and a second textual segment, of the plurality of textual segments.

These and other implementations of technology disclosed herein can optionally include one or more of the following features.

In some implementations, the method further includes determining, based on the LLM output, additional generative multimedia content for inclusion in the multi-modal response. The additional generative multimedia content may be indicative of an additional generative multimedia content item to be included in the multi-modal response, and causing the multi-modal response to be rendered at the client device of the user further may include: causing the additional generative multimedia content item to be visually rendered via the display of the client device and/or via one or more speakers of the client device. The additional generative multimedia content item may be interleaved between the second textual segment and a third textual segment, of the plurality of textual segments.

In some implementations, a method implemented by one or more processors is provided, and includes: obtaining a plurality of training instances to be utilized in fine-tuning a large language model (LLM). Each training instance, of the plurality of training instance, includes: a corresponding natural language (NL) based input, and a corresponding multi-modal response that is responsive to the corresponding NL based input, the corresponding multi-modal response including corresponding textual content and one or more corresponding generative multimedia content prompts, each of the one or more corresponding generative multimedia content prompts being indicative of corresponding generative multimedia content that is to be included in the corresponding multi-modal response. The method further includes fine-tuning, based on the plurality of training instances, the LLM; and causing the LLM to be deployed for utilization in generating subsequent multi-modal responses that are responsive to subsequent NL based inputs that are associated with client devices of users.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) based input associated with a client device of a user;

generating a multi-modal response that is responsive to the NL based input, wherein generating the multi-modal response that is responsive to the NL based input comprises:

processing, using a large language model (LLM), LLM input to generate LLM output, the LLM input including at least the NL based input;

determining, based on the LLM output, textual content for inclusion in the multi-modal response and a natural language generative multimedia content prompt that is indicative of generative multimedia content that is to be included in the multi-modal response; and obtaining, based on the natural language generative multimedia content prompt, the generative multimedia content for inclusion in the multi-modal response, wherein obtaining the generative multimedia content for inclusion in the multi-modal response based on the natural language generative multimedia content prompt comprises:

submitting, to a generative multimedia content model, the natural language generative multimedia content prompt; and in response to submitting the natural language generative multimedia content prompt to the generative multimedia content model, obtaining the generative multimedia content, the generative multimedia content including one or more of: generative image content, generative video content, or generative audio content; and causing the multi-modal response to be rendered at the client device of the user in a streaming manner, wherein causing the multi-modal response to be rendered at the client device of the user in the streaming manner comprises:

causing the textual content to be rendered at the client device as the textual content is determined based on the LLM output;

causing a placeholder to be rendered at the client device along with the textual content, the placeholder being indicative of where the generative multimedia content will be rendered with respect to the textual content, and the placeholder including an indication of one or more of: the natural language generative multimedia content prompt, or the generative multimedia content model; and causing the placeholder for where the generative multimedia content will be rendered to be replaced with the generative multimedia content responsive to the generative multimedia content being obtained.

2. The method of claim 1, further comprising:

determining, based on the natural language generative multimedia content prompt, a type of the generative multimedia content that is to be included in the multi-modal response; and selecting, based on the type of the generative multimedia content, the generative multimedia content model, and from among a plurality of disparate generative multimedia content models, the generative multimedia content model to be utilized in obtaining the generative multimedia content.

3. The method of claim 2, wherein the type of the generative multimedia content that is to be included in the multi-modal response comprises the generative image content, and wherein the generative multimedia content model that is selected is a generative image content model.

4. The method of claim 2, wherein the type of the generative multimedia content that is to be included in the multi-modal response comprises the generative video content, and wherein the generative multimedia content model that is selected is a generative video content model.

5. The method of claim 2, wherein the type of the generative multimedia content that is to be included in the multi-modal response comprises the generative audio content, and wherein the generative multimedia content model that is selected is a generative audio content model.

6. The method of claim 2, wherein the type of generative multimedia content that is to be included in the multi-modal response comprises two or more of: the generative image content, the generative video content, or the generative audio content.

7. The method of claim 1, wherein the LLM is managed by a first-party entity, and wherein the generative multimedia content model is managed by the first-party entity.

8. The method of claim 1, wherein the LLM is managed by a first-party entity, wherein the generative multimedia content model is managed by a third-party entity, and wherein the third-party entity that manages the generative multimedia content model is distinct from the first-party entity that manages the LLM.

9. The method of claim 1, wherein the textual content that is included in the multi-modal response includes a plurality of textual segments, and wherein the generative multimedia content that is included in the multi-modal response includes a generative multimedia content item that is interleaved between a first textual segment, of the plurality of textual segments, and a second textual segment, of the plurality of textual segments.

10. The method of claim 1, wherein the LLM input further includes a prompt that indicates the generative multimedia content should be included in the multi-modal response.

11. The method of claim 1, wherein the NL based input does not explicitly include a request that any generative multimedia content be rendered at the client device of the user.

12. The method of claim 1, wherein causing the multi-modal response to be rendered at the client device of the user comprises:

causing the textual content to be visually rendered via a display of the client device; and causing the generative multimedia content to be visually rendered via the display of the client device and/or audibly rendered via one or more speakers of the client device.

13. The method of claim 1, further comprising:

determining, based on the LLM output, whether the multi-modal response should include the generative multimedia content or non-generative multimedia content, wherein obtaining the generative multimedia content for inclusion in the multi-modal response is in response to determining that the LLM output includes the generative multimedia content prompt and in lieu of a non-generative multimedia content tag.

14. The method of claim 13, further comprising:

in response to determining that the LLM output includes the non-generative multimedia content tag:

obtaining, based on the non-generative multimedia content tag, non-generative multimedia content that is to be included in the multi-modal response.

15. A method implemented by one or more processors, the method comprising:

receiving natural language (NL) based input associated with a client device of a user;

generating a multi-modal response that is responsive to the NL based input, wherein generating the multi-modal response that is responsive to the NL based input comprises:

processing, using a large language model (LLM), LLM input to generate LLM output, the LLM input including at least the NL based input; and determining, based on the LLM output, textual content for inclusion in the multi-modal response and generative multimedia content for inclusion in the multi-modal response, wherein the textual content includes a plurality of textual segments to be included in the multi-modal response, wherein the generative multimedia content is indicative of a generative multimedia content item to be included in the multi-modal response, and wherein the generative multimedia content includes one or more of: generative image content, generative video content, or generative audio content; and causing the multi-modal response to be rendered at the client device of the user in a streaming manner, wherein causing the multi-modal response to be rendered at the client device of the user in the streaming manner comprises:

causing the plurality of textual segments to be visually rendered via a display of the client device as each of the plurality of textual segments is determined based on the LLM output;

causing a placeholder to be rendered at the client device along with the textual content, the placeholder being indicative of where the generative multimedia content will be rendered with respect to the plurality of textual segments, and the placeholder including an indication of one or more of: a natural language generative multimedia content prompt utilized in obtaining the generative multimedia content, or a generative multimedia content model utilized in generating the generative multimedia content based on the natural language generative multimedia content prompt; and causing the generative multimedia content item to be visually rendered via the display of the client device and/or via one or more speakers of the client device, wherein the generative multimedia content item is interleaved between a first textual segment, of the plurality of textual segments, and a second textual segment, of the plurality of textual segments, and wherein the generative multimedia content replaces the placeholder responsive to the generative multimedia content being obtained.

16. The method of claim 15, further comprising:

determining, based on the LLM output, additional generative multimedia content for inclusion in the multi-modal response, wherein the additional generative multimedia content is indicative of an additional generative multimedia content item to be included in the multi-modal response, and wherein causing the multi-modal response to be rendered at the client device of the user further comprises:

causing the additional generative multimedia content item to be visually rendered via the display of the client device and/or via one or more speakers of the client device, wherein the additional generative multimedia content item is interleaved between the second textual segment and a third textual segment, of the plurality of textual segments.

17. A system comprising:

at least one processor; and memory storing instructions that, when executed, cause the at least one processor to be operable to:

receive natural language (NL) based input associated with a client device of a user;

generate a multi-modal response that is responsive to the NL based input, wherein the instructions to generate the multi-modal response that is responsive to the NL based input comprise instructions to:

process, using a large language model (LLM), LLM input to generate LLM output, the LLM input including at least the NL based input; and determine, based on the LLM output, textual content for inclusion in the multi-modal response and generative multimedia content for inclusion in the multi-modal response, wherein the textual content includes a plurality of textual segments to be included in the multi-modal response, wherein the generative multimedia content is indicative of a generative multimedia content item to be included in the multi-modal response, and wherein the generative multimedia content includes one or more of: generative image content, generative video content, or generative audio content; and cause the multi-modal response to be rendered at the client device of the user in a streaming manner, wherein the instructions to cause the multi-modal response to be rendered at the client device of the user in the streaming manner comprise instructions to:

cause the plurality of textual segments to be visually rendered via a display of the client device as each of the plurality of textual segments is determined based on the LLM output;

cause a placeholder to be rendered at the client device along with the textual content, the placeholder being indicative of where the generative multimedia content will be rendered with respect to the plurality of textual segments, and the placeholder including an indication of one or more of: a natural language generative multimedia content prompt utilized in obtaining the generative multimedia content, or a generative multimedia content model utilized in generating the generative multimedia content based on the natural language generative multimedia content prompt; and cause the generative multimedia content item to be visually rendered via the display of the client device and/or via one or more speakers of the client device, wherein the generative multimedia content item is interleaved between a first textual segment, of the plurality of textual segments, and a second textual segment, of the plurality of textual segments, and wherein the generative multimedia content replaces the placeholder responsive to the generative multimedia content being obtained.

* * * * *